United States Patent [19]

Frysz et al.

[11] Patent Number: 5,114,810
[45] Date of Patent: May 19, 1992

[54] CATHODE CURRENT COLLECTOR MATERIAL FOR SOLID CATHODE CELL

[75] Inventors: Christine A. Frysz, East Amherst; W. Richard Brown, Clarence Center, both of N.Y.

[73] Assignee: Wilson Greatbatch Ltd., Clarence, N.Y.

[21] Appl. No.: 475,261

[22] Filed: Feb. 5, 1990

[51] Int. Cl.$^5$ .................. C22C 38/42; C22C 30/02
[52] U.S. Cl. ........................... 429/194; 429/245
[58] Field of Search ...................... 429/194, 245

[56] References Cited

U.S. PATENT DOCUMENTS

| | | | |
|---|---|---|---|
| Re. 31,489 | 1/1984 | Sekido et al. | 429/191 |
| 3,636,532 | 10/1970 | Watanabe et al. | 429/194 |
| 3,925,101 | 12/1975 | Lehmann et al. | 429/194 |
| 4,271,242 | 6/1981 | Toyoguchi et al. | 429/194 |
| 4,717,634 | 1/1988 | Daifuku et al. | 429/194 |
| 4,818,483 | 4/1989 | Culling | 420/46 |

OTHER PUBLICATIONS

Japanese patent publication No. 186467–Aug. 14, 1987; T. Chira et al.
Japanese patent publication No. 15067; Apr. 21, 1980; M. Aoki et al.
W. German publication–Thyssen Edelstahlwerke AG–An Advanced, High Alloyed Ferritic Stainless Steel With Outstanding Corrosion Resistance–Superferrit Remanit 4575.

*Primary Examiner*—Brian E. Hearn
*Assistant Examiner*—Maria Nuzzolillo
*Attorney, Agent, or Firm*—Hodgson, Russ, Andrews, Woods & Goodyear

[57] ABSTRACT

A highly alloyed nickel-containing ferritic stainless steel material for use as a cathode current collector for lithium solid cathode cells is provided. The material does not require costly melting practices and provides high corrosion resistance particularly where elevated temperature, 72° C. or higher, storage and performance is required relative to other cathode current collector materials thereby increasing cell longevity.

11 Claims, 12 Drawing Sheets

CATHODE CURRENT COLLECTOR MATERIAL FOR SOLID CATHODE CELL

FIELD OF THE INVENTION

This invention relates generally to a cathode current collector for lithium/solid cathode cells, and more specifically to a highly alloyed nickel-containing ferritic stainless steel as cathode current collector material.

BACKGROUND OF THE INVENTION

The cathode current collector serves several functions in a cell. First, the cathode current collector conducts the flow of electrons between the cell active material and the cell terminals. Second, the cathode current collector supports the cathode material utilized in the cell. But cathode current collector materials must maintain chemical stability and mechanical integrity in corrosive electrolytes throughout cell life. The availability of materials capable of operating at elevated temperatures are limited. Accordingly, whenever operating conditions are such that passivity is compromised, corrosion occurs.

Titanium has proven corrosion resistant as a cathode current collector material. However, at elevated temperatures i.e. 72° C. or higher, titanium and other alloys used for fabricating cathode current collectors are known to exhibit corrosion when exposed to aggressive cell environments.

Another material proposed for use as a cathode current collector in cells is ferritic stainless steel. Japanese patent publication No. 186467 discloses using a ferritic stainless steel containing about 18-20 percent by weight chromium, 1.8-2.5 percent by weight molybdenum and the sum of interstitial elements titanium and niobium limited to less than 0.45 percent by weight.

Furthermore, Japanese patent publication No. 15067 discloses using a ferritic stainless steel containing about 29-31 percent by weight chromium, 1.7-2.3 percent by weight molybdenum and the sum of interstitial elements carbon and nitrogen limited to less than 0.015 percent by weight.

Further, limitation of carbon and nitrogen to such low levels as disclosed in Japanese publication No. 15067 requires costly melting practices such as vacuum melting at the mill producing the high purity ferritic stainless steel.

Therefore, it would be highly desirable to provide an improved ferritic stainless steel cathode current collector material that does not require costly melting practices and provides a high corrosion resistance particularly where elevated temperature storage and performance is required thereby increasing cell longevity compared to cathode current collector materials such as titanium and to other ferritic stainless steels.

OBJECTS AND SUMMARY OF THE INVENTION

Accordingly, it is the primary object of the present invention to provide a cathode current collector material which exhibits high corrosion resistance thereby increasing cell longevity.

Another object of the present invention is to provide a cathode current collector material that exhibits high corrosion resistance at elevated temperatures, such as about 180° C.

Another object of the present invention is to provide a cathode current collector material which is less expensive because it does not require costly melting procedures.

Another object of the present invention is to provide a cathode current collector suitable for lithium solid cathode cells.

A cathode current collector material is provided for lithium solid cathode cells. The cathode current collector material comprises a highly alloyed nickel-containing ferritic stainless steel. The cathode current collector provides high corrosion resistance particularly where elevated temperature storage and performance is required thereby increasing cell longevity relative to other cathode current collector materials.

The preferred highly alloyed nickel-containing ferritic stainless steel comprises by weight:
  from about 27.0 percent to about 29.0 percent chromium;
  from about 2.0 percent to about 3.0 percent molybdenum;
  from about 3.0 percent to about 4.5 percent nickel;
  the sum of carbon plus nitrogen in an amount less than or equal to 0.045 percent;
  the sum of niobium and zirconium in an amount of at least ten times the percent of carbon plus nitrogen; and
  the remainder being iron.

In another preferred formulation thereof, the highly alloyed nickel-containing ferritic stainless steel comprises by weight:
  from about 28.0 percent to about 30.0 percent chromium;
  from about 3.5 percent to about 4.2 percent molybdenum;
  from about 2.0 percent to about 2.5 percent nickel;
  the sum of carbon plus nitrogen in an amount less than or equal to 0.025 percent; and
  the remainder being iron.

Furthermore, the highly alloyed nickel-containing ferritic stainless steels described above may also comprise small amounts of other elements selected from the group consisting of copper, magnesium, phosphorous, sulfur and silicon.

DETAILED DESCRIPTION OF THE INVENTION

Figure 1:
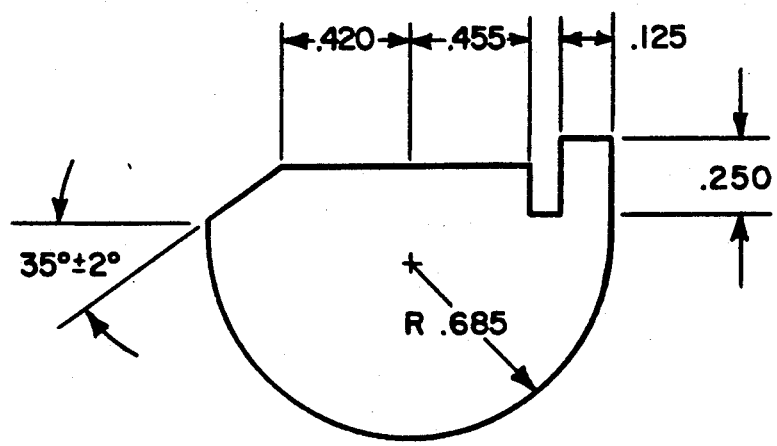
FIG. 1 is a sketch of a cathode current collector formed from material according to the present invention.

The present invention provides a cathode current collector material for lithium solid cathode cells comprising a highly alloyed nickel-containing ferritic stainless steel which provides superior corrosion resistance particularly where elevated temperature storage and performance is required thereby increasing cell longevity relative to other cathode current collector materials. Further, the cathode current collector material of the present invention is less expensive because it does not require costly melting procedures.

The highly alloyed nickel-containing ferritic stainless steel material for use as a cathode current collector according to the present invention as will be explained further on and formulated in Tables 1 and 3 is currently available under the name SUPERFERRIT (REMANIT 4575) supplied by Thyssen Edelstahlwerke Ag of West Germany. An alternative highly alloyed nickel-containing ferritic stainless steel material for use as a cathode current collector according to the present invention as will be explained further on and formulated in Tables 2 and 4 is currently available under the name AL 29-4-2 (or UNS S44800 in ASTM and ASME specifications) supplied by Allegheny Ludlum Steel Corporation of United States. The cathode current collector material of the present invention generally comprises the elements iron, chromium, molybdenum, nickel, carbon, nitrogen, niobium, zirconium and small amounts of other elements.

The chromium element of the cathode current collector material confers general corrosion resistance, and resistance to pitting and crevice corrosion to the cathode current collector. The chromium element of the cathode current collector material preferably comprises from about 27.0 percent to about 30.0 percent by weight of the material. For purposes of formulating a cathode current collector material within the scope of the present invention, and for illustration only, not limitation, the element chromium comprises about 28.67 percent by weight of the material.

The molybdenum element of the cathode current collector material also confers general corrosion resistance, and resistance to pitting and crevice corrosion to the cathode current collector. The molybdenum element of the cathode current collector material comprises from about 2.0 percent to about 4.2 percent by weight of the material. For purposes of formulating a cathode current collector material within the scope of the present invention, and for illustration only, not limitation, the element molybdenum comprises about 2.32 percent by weight of the material.

The nickel element of the cathode current collector material improves aspects of corrosion resistance in very aggressive media such as reducing acids and under extreme conditions such as those simultaneously promoting stress corrosion cracking and crevice corrosion. Because these conditions often develop in cell environments, it has been discovered that the nickel element in the formulation does not serve as a detriment as suggested in Japanese patent publication Nos. 186467 and 15067. The Japanese publications suggest with regard to cell performance that a cathode current collector material which includes the element nickel reacts negatively to environmental exposure. That is, stress corrosion cracking and crevice corrosion is noted. The nickel element of the cathode current collector material comprises from about 2.0 percent to about 4.5 percent by weight of the material. For purposes of formulating a cathode current collector material within the scope of the present invention, and for illustration only, not limitation, the element nickel comprises about 3.5 percent by weight of the material.

To achieve very low carbon and nitrogen levels when producing stainless steel, costly melting practices such as vacuum melting must be employed. Relaxing the carbon and nitrogen limit to less than or equal to 0.045 percent by weight allows the consideration of alternative, less expensive melting techniques which are then reflected in the material cost. The cathode current collector material described herein reflects this advantage. For purposes of formulating a cathode current collector material within the scope of the present invention, and for illustration only, not limitation, the elements carbon plus nitrogen comprises about 0.029 percent by weight of the material.

The elements niobium plus zirconium present in the cathode current collector material comprise by weight an amount greater than or equal to about ten times the percent of carbon plus nitrogen present in material. The niobium and zirconium are included in the material to stabilize the carbon and nitrogen. For purposes of formulating a cathode current collector material within the scope of the present invention, and for illustration only, not limitation, the elements niobium plus zirconium comprise about 0.29 percent by weight of the material.

Additionally, small amounts of other elements may be present in the cathode current collector material. For purposes of formulating a cathode current collector material within the scope of the present invention, and for illustration only, not limitation, such elements may comprise by weight from about 0.03 percent to about 0.18 percent silicon, from about 0.01 percent to about 0.42 percent manganese, an amount less than or equal to about 0.02 percent sulfur, and amount less than or equal to about 0.025 percent phosphorus and an amount less than or equal to about 0.15 percent copper.

The cathode current collector material of the present invention may be fabricated by any of the following techniques: mechanical expansion, chemical machining, etching or milling, electrolytic etching, woven fabric, perforation or foil with vapor deposited bonding layer.

The following table sets forth a preferred formulation for the cathode current collector material of the present invention wherein the compositional ranges of the various elements are by weight percent of the total material:

TABLE 1 from about 27.0 percent to about 29.0 percent chromium;
from about 2.0 percent to about 3.0 percent molybdenum;
from about 3.0 percent to about 4.5 percent nickel;
the sum of carbon plus nitrogen in an amount less than or equal to 0.045 percent;
the sum of niobium plus zirconium in an amount of at least ten times the percent of carbon plus nitrogen;
small amounts of other elements; and
the remainder being iron.

The following table sets forth another formulation for the cathode current collector material of the present invention wherein the compositional ranges of the various elements are by weight percent of the total material:

TABLE 2 from about 28.0 percent to about 30.0 percent chromium;
from about 3.5 percent to about 4.2 percent molybdenum;
from about 2.0 percent to about 2.5 percent nickel;
the sum of carbon plus nitrogen in an amount less than or equal to 0.045% percent;
small amounts of other elements; and
the remainder being iron.

For purposes of formulating a cathode current collector material within the scope of the present invention, and for illustration only, not limitation, the following table sets forth a formulation wherein the composition of the various elements is by weight percent of the total material:

TABLE 3 about 28.67% chromium;
about 2.32% molybdenum;
about 3.52% nickel;
about 0.029% carbon plus nitrogen;
about 0.29% niobium plus zirconium;
about 0.31% silicon;
about 0.12% magnesium;
about 0.15% phosphorous; and
the remainder being iron.

For purposes of formulating a cathode current collector material within the scope of the present invention, and for illustration only, not limitation, the following table sets forth another formulation wherein the composition of the various elements is by weight percent of the total material:

TABLE 4 about 29.0% chromium;
about 4.0% molybdenum;
about 2.10% nickel;
about 0.018% carbon plus nitrogen;
about 0.06% copper;
about 0.05% magnesium;
about 0.02% phosphorous;
about 0.01% sulfur;
about 0.10% silicon; and
the remainder being iron.

The cathode current collector material of the present invention may be used in lithium solid cathode cells such as lithium fluorinated carbon cells, lithium metal oxide bronze cells, and lithium metal oxide cells. For a detailed description of lithium fluorinated carbon cells which enable use of the cathode current collector material of the present invention reference is made to U.S. Pat. Nos. 3,536,532, 3,700,502 and 4,271,242, the disclosures of which are hereby incorporated by reference.

Figure 21:
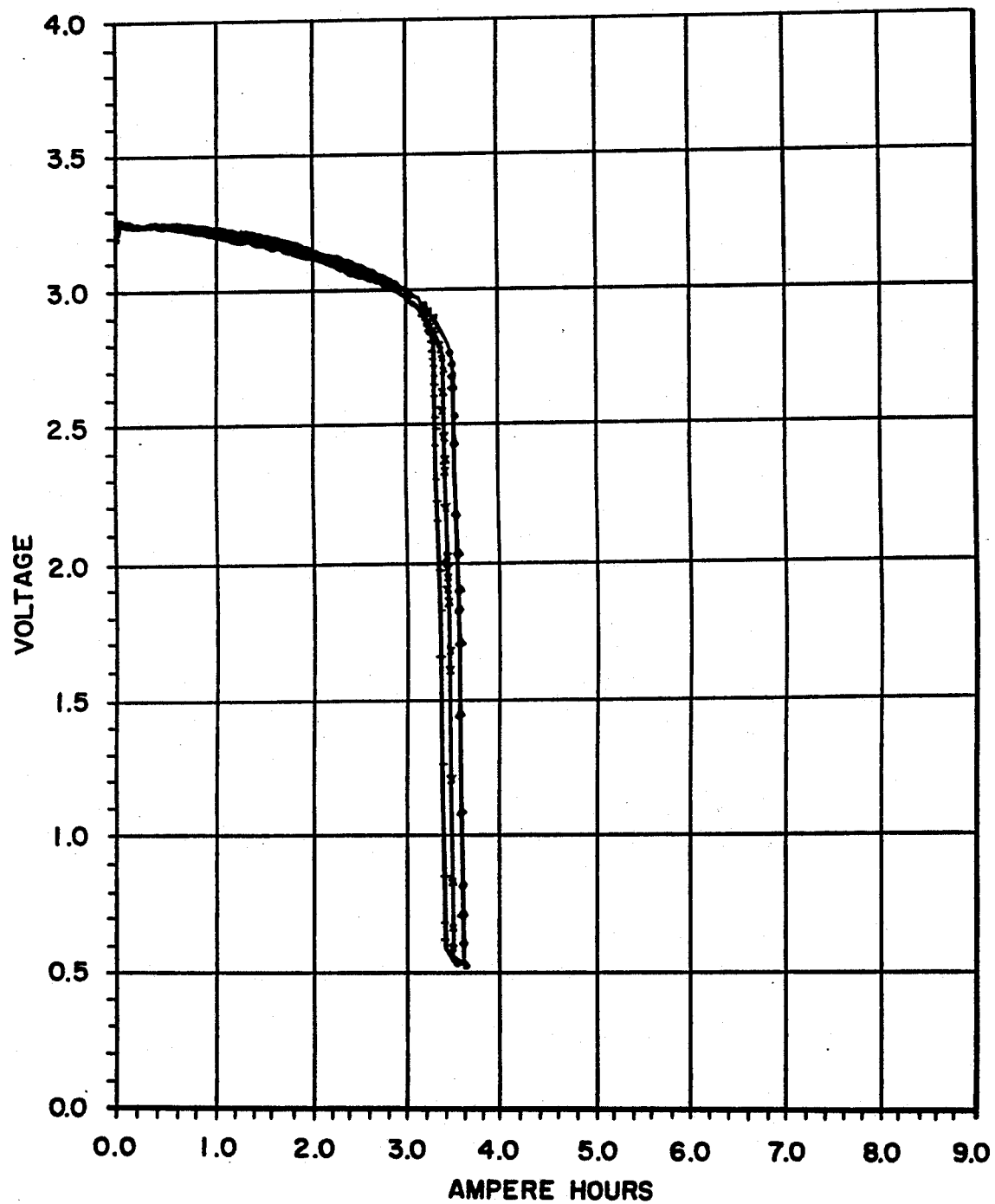
FIG. 21 is a graph showing discharge at 180° C. under 301 ohm load of the PMX-HT cell described herein using the cathode current collector material of the present invention.
Figure 22:
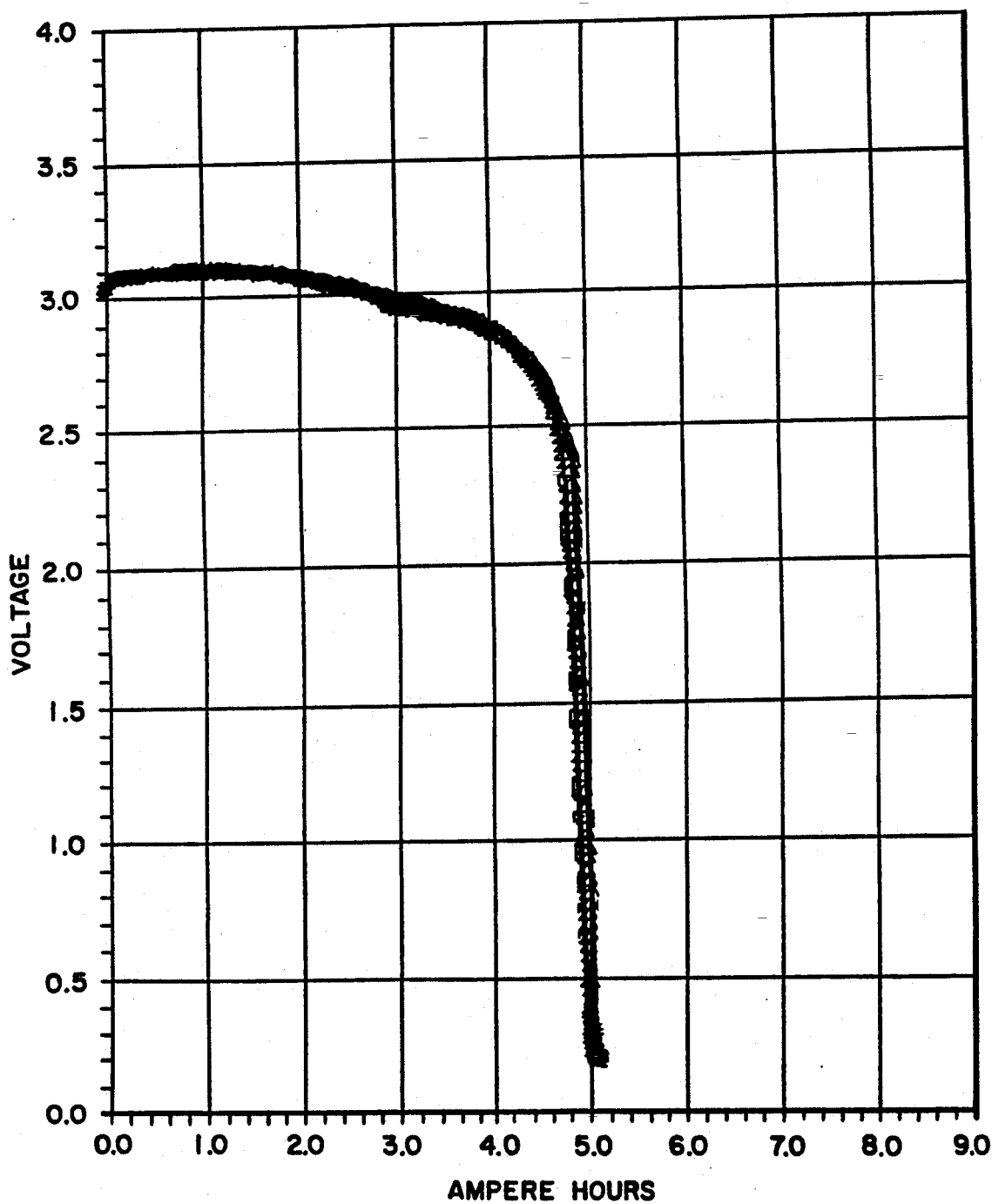
FIG. 22 is a graph showing discharge at 180° C. under 56 ohm load of the PMX-HT cell described herein using the cathode current collector material of the present invention.

An additional lithium fluorinated carbon cell compatible for use of the cathode current collector material of the present invention is the C-size cell designated series PMX-HT of Wilson Greatbatch Limited of Clarence, New York. The PMX-HT cell demonstrates an energy density of from about 0.25 watt hrs./cc to about 0.6 watt hrs./cc to 2 V under a nominal load of from about 3 ohm to 1 k ohm and at a temperature of from about $-20°$ C. to 180° C. Furthermore, the cell exhibits consistent operational performance over a temperature range of from about $-20°$ C. to about 180° C. with an operating life at 180° C. of about eighteen days, provides an open circuit voltage output of from about 3.0 volts to about 3.5 volts, a nominal current capacity of 4.0 AH, a continuous discharge rate to 250 mA, and an estimate self discharge rate of less than 2% per year. With reference to FIGS. 21 and 22, there is shown discharge curves at 180° C. and 301 ohm and 56 ohm loads, respectively, showing the performance of the PMX-HT cell using the cathode current collector material SUPERFERRIT, as described herein. The cell using this material as the cathode current collector is characterized as a 4 ampere hour cell. Further, it has been discovered that this cell using the SUPERFERRIT material as the cathode current collector exhibits better discharge performance at elevated temperatures i.e. 72° C. or higher, than a cell using titanium as a cathode current collector.

For a detailed description of a lithium metal oxide bronze cell compatible to use the cathode current collector material of the present invention reference is made to U.S. Pat. No. 4,391,729, the disclosure of which is hereby incorporated by reference.

For a detailed description of lithium metal oxide cells compatible to use the cathode current collector material of the present invention, reference is made to U.S. Pat. No. 3,945,848 which discloses the use of cobalt (III) oxide, U.S. Pat. No. 4,158,722 which discloses the use of chromium oxide and U.S. Pat. No. 3,423,242 which discloses the use of vanadium pentoxide, the disclosures of which are hereby incorporated by reference.

It is understood that the above identified cells are for the purpose of illustration only, and not limitation, and that the present invention is applicable to any cell which enables use of the cathode current collector material of the present invention. The high corrosion resistance of the cathode current collector materials described herein will become more apparent to one skilled in the art with reference to the following examples.

EXAMPLE I

Evaluation of corrosion behavior of 304 low carbon austenitic stainless steel (304L SS), Grade 1 titanium and the cathode current collector material of the present invention SUPERFERRIT in lithium silver/vanadium oxide cells was conducted. Fifty-four 7 mm thick case negative lithium silver/vanadium oxide cells were built. These cells consisted of three groups relative to the cathode current collector materials used. The titanium group was further subdivided into three groups. The cathode plates of one group were weighed and then humidified at 25° C. in a humidity chamber registering 95.5% relative humidity for a duration of 7.25 hours in an attempt to generate a more protective $TiO_2$ passivation layer. Following humidification, the cathode plates were placed in a 110° C. vacuum oven for 28.5 hours then re-weighed. They were returned to the vacuum oven for another 17.25 hours and again re-weighed. The second group contained cathode plates in which the screens alone were humidified at 98% relative humidity for 30 hours then placed in a 110° C. vacuum oven for 20 hours. Both these groups utilized expanded metal screens. The third group consisted of cathode screens which were titanium screens machined and stamped as indicated in FIG. 1. Screens were chemically machined from 304 low carbon austenitic stainless steel screens to a thickness of 0.005 inch. SUPERFERRIT material of 0.008 inch thickness was obtained from Thyssen Co., Germany. These screens were machined and stamped as depicted in FIG. 1.

Six of the above cells, one each from the titanium groups, one containing SUPERFERRIT and two containing 304L SS, were placed at 72° C. on open circuit for 1 month. The cathode current collectors were evaluated for corrosion resistance. Anode and separator observations were also conducted.

Of the above materials tested in the 7 mm thick cells stored open circuit at 72° C., SUPERFERRIT exhibited the better response to elevated temperature exposure in lithium silver vanadium oxide. Pitting corrosion was found on the titanium screen exposed to humidity after cathode plate fabrication but not on the pre-humidified titanium screen nor those having no post-cathode pressing humidity treatment. Examination of the SUPERFERRIT cathode current collector revealed no visual evidence of change in surface condition from that of pre-production surface conditions. Cells having 304L SS screens exhibited variable corrosion performance in the lithium silver vanadium oxide environment.

EXAMPLE II

To further evaluate the response of the cathode current collector materials of Example I at longer elevated temperature open circuit exposure, seven 7 mm thick case negative lithium silver vanadium oxide cells were selected for 3 month storage at 72° C. Three groups sorted according to cathode material used were three Grade 1 titanium cells: expanded titanium (humidified screen), machined titanium (humidified plate) and machined titanium (as received); two SUPERFERRIT and two 304L SS containing cells. In addition, four of the seven cells, two titanium one SUPERFERRIT and one 304L SS, were submitted for 1 k ohm discharge to observe the effect of elevated temperature storage on cell performance.

Anode surfaces of the SUPERFERRIT containing cells were fairly clean and bright. The titanium containing cells exhibited small areas of dark grey to black discoloration at the terminal pin upon which small traces of titanium were detected by energy dispersive X-ray (EDX) after 72° C. storage. Of the two 304L SS containing cells, one demonstrated heavy black discoloration of the remainder of the discharged anode particularly near the terminal pin, the anode surface of the other was found to be enveloped in a black layer of material. The separator for the cell also exhibited total black discoloration and EDX detected Cr, Fe and Ni on the discolored surfaces. Open circuit voltages remained stable for all cells except one of the 304L SS containing cells which demonstrated a significant open circuit voltage decrease from 3.27 V after burn-in to 2.50 V.

Examination of the cathode screen in the one 304L SS containing cell revealed heavy pitting with extensive corrosion of the screen tab. The degree of pitting in the other cell was much less in comparison to the first. All three titanium cathode current collectors exhibited pits over various face areas with heavy pit concentration near and along the expanded metal and stamped edges. Following 72° C. storage the degree and number of pits were similar for all three cells without preference to mode of manufacture or pre-assembly treatment.

Examination of the SUPERFERRIT cathode current collectors revealed no visual evidence of change in surface condition from that of pre-production surface conditions.

EXAMPLE III

Potentiodynamic polarization at 37° C. was used as a qualitative technique to determine material behavior in the electrolyte when scanned at a rate of 0.2 mV/s from 2.0 V to 4.0 V using a lithium reference electrode and a platinum wire as an auxiliary electrode. The potentiodynamic polarization procedure as outlined in the ASTM method G5-82 entitled "Standard Reference Method for Making Potentiostatic and Potentiodynamic Polarization Measurements" was followed. An alternate TEFLON test cell with a 35–40 ml capacity was designed for use with this method.

Figure 2:
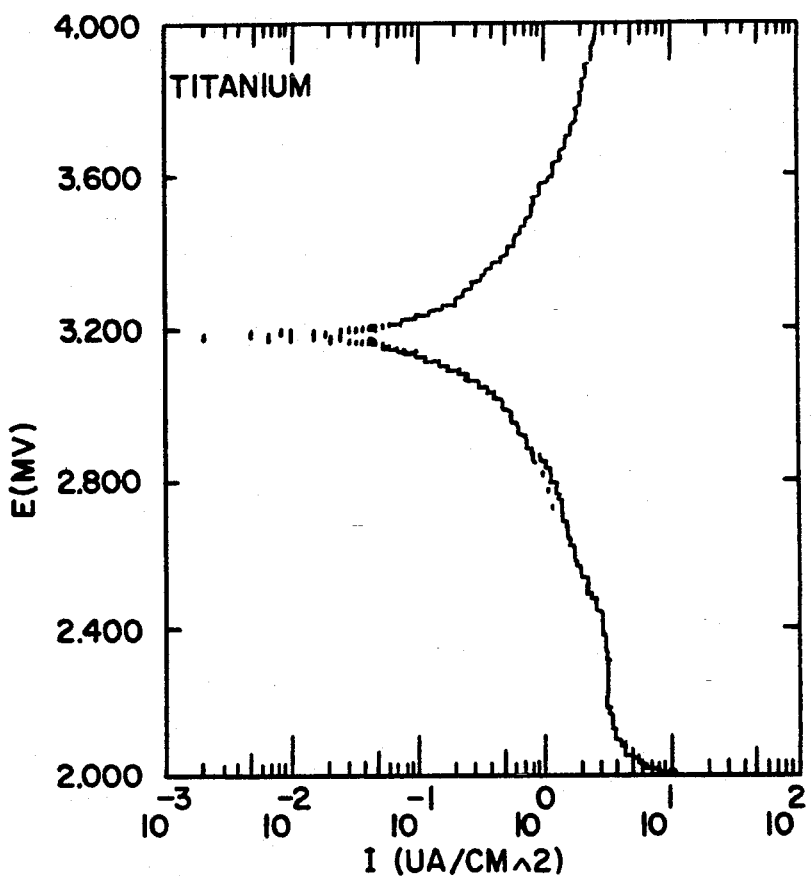
FIG. 2 is a potentiodynamic polarization plot for titanium in 1M $LiAsF_6$/PC/DME 1:1.
Figure 3:
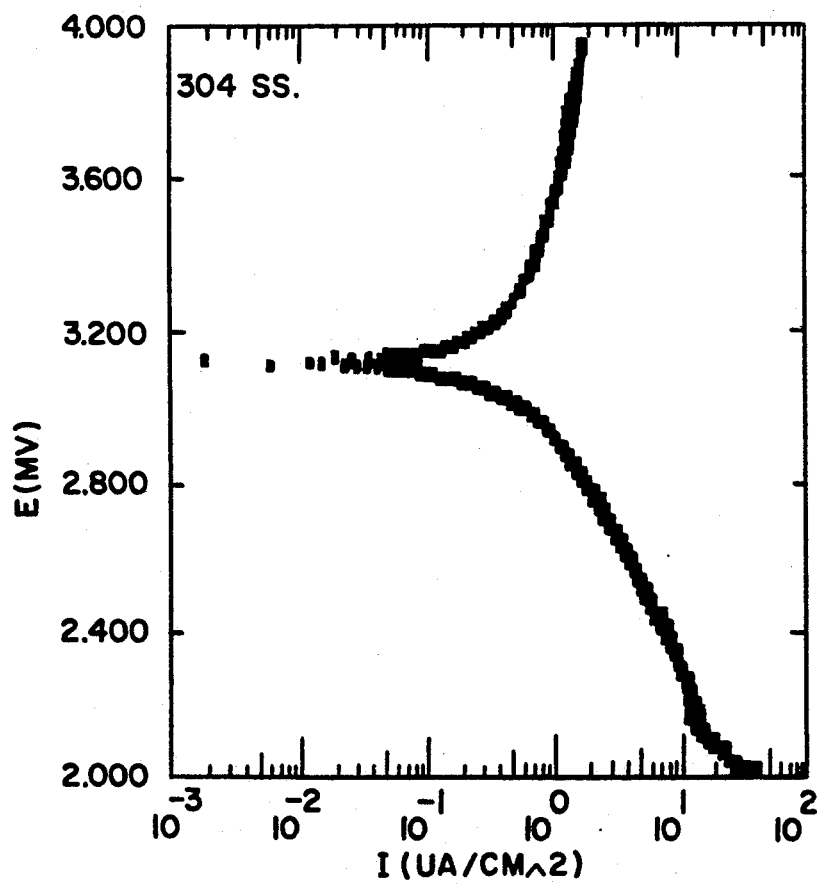
FIG. 3 is a potentiodynamic polarization plot for 304L SS in 1M $LiAsF_6$/PC/DME 1:1.
Figure 4:
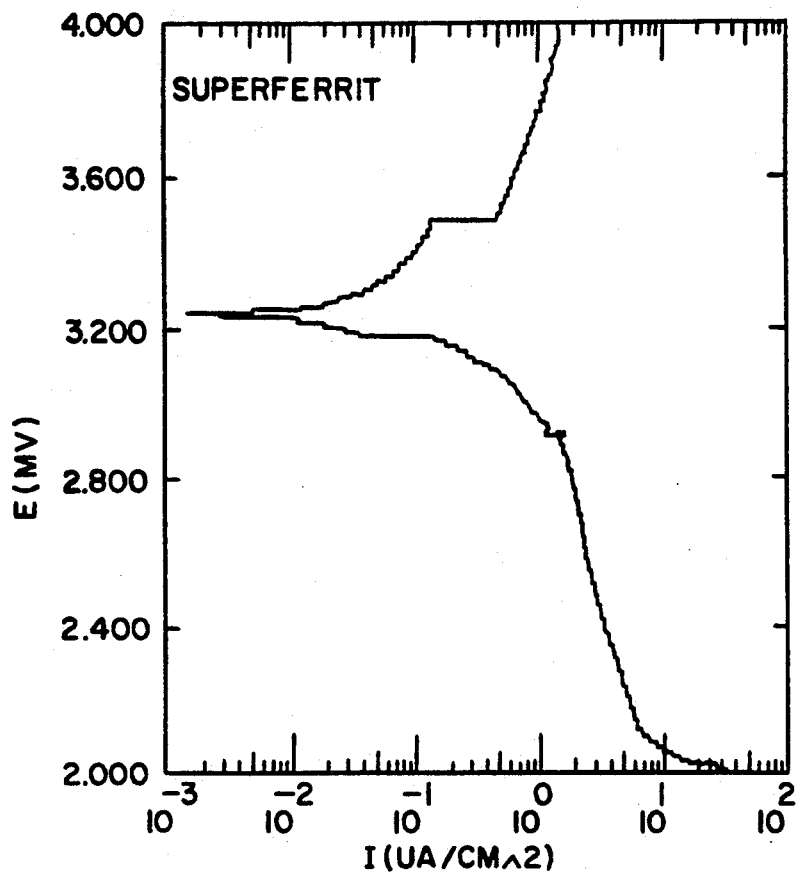
FIG. 4 is a potentiodynamic polarization plot for SUPERFERRIT in 1M $LiAsF_6$/PC/DME 1:1.
Figure 5:
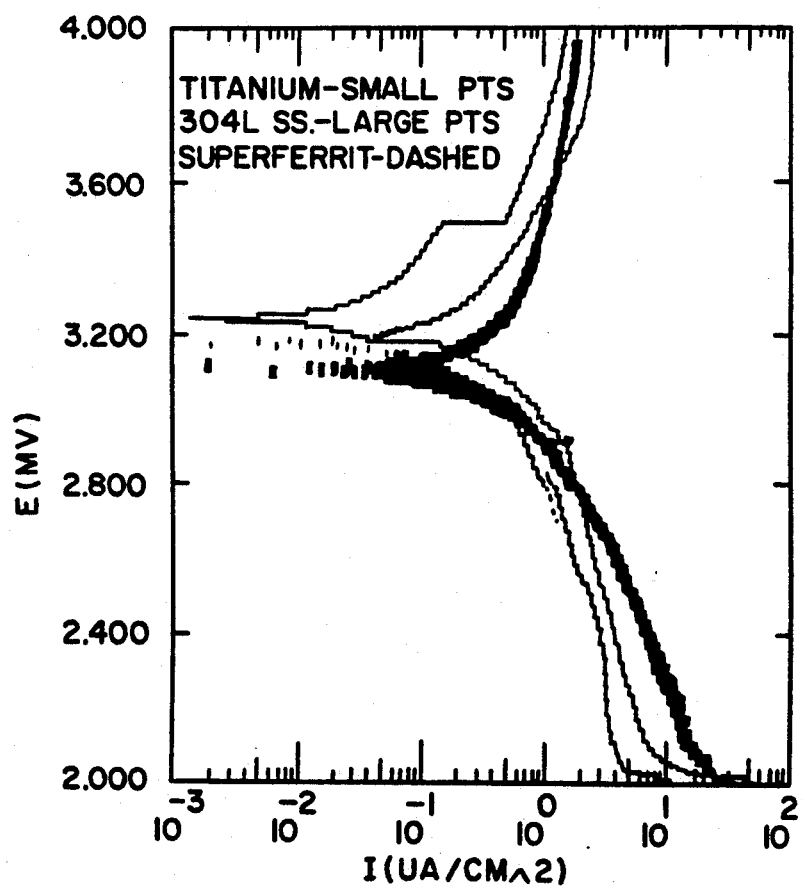
FIG. 5 is a potentiodynamic polarization plot overlay for Ti/304L SS/SUPERFERRIT in 1M $LiAsF_6$/PC/DME 1:1.

Polarization characteristics of these materials were obtained by plotting the current response as a function of the applied potential via a log current function versus a potential semi-log chart. FIGS. 2, 3 and 4 represent polarization plots for titanium, 304L SS and SUPERFERRIT materials respectively. A superimposition of the three plots shown in FIG. 5 provided the overall comparison for the metals tested.

Results obtained suggest that titanium and SUPERFERRIT exhibited comparable behavior in the test medium with measured equilibrium potentials above actual cell open circuit potential. On the other hand, 304L SS maintained an equilibrium potential below this value. Current densities for 304L SS at 3.25 V were higher than for the other two metals. This would infer that 304L SS would show a predisposition to corrode at cell operating potentials.

EXAMPLE IV

Figure 6:
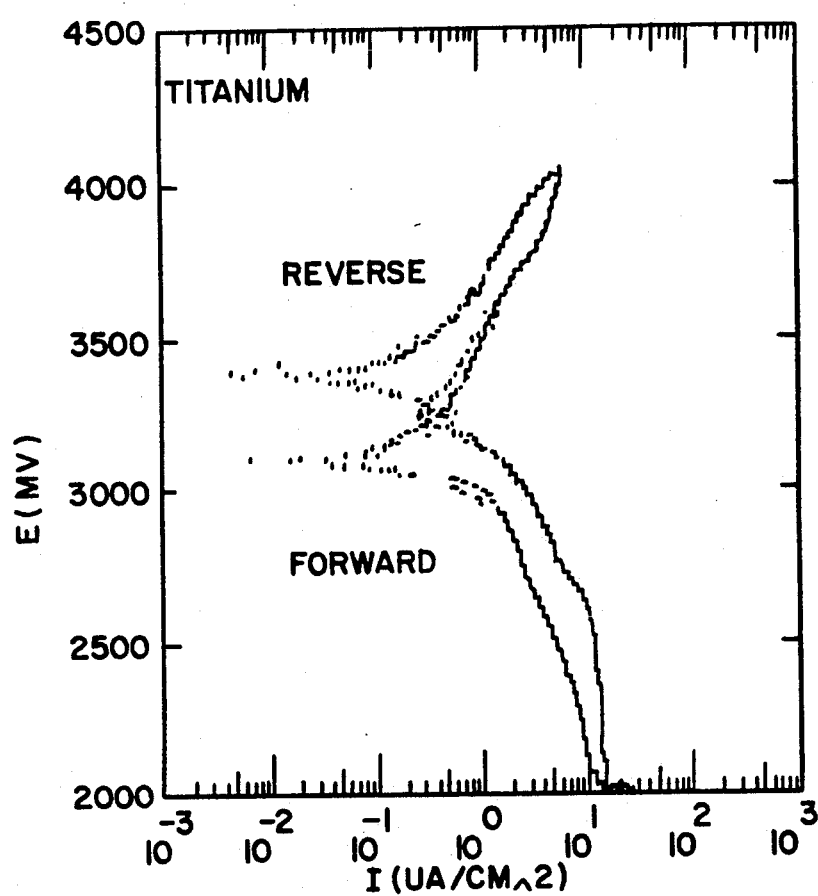
FIG. 6 is a cyclic polarization plot for Titanium in 1M $LiAsF_6$/PC/DME 1:1.
Figure 7:
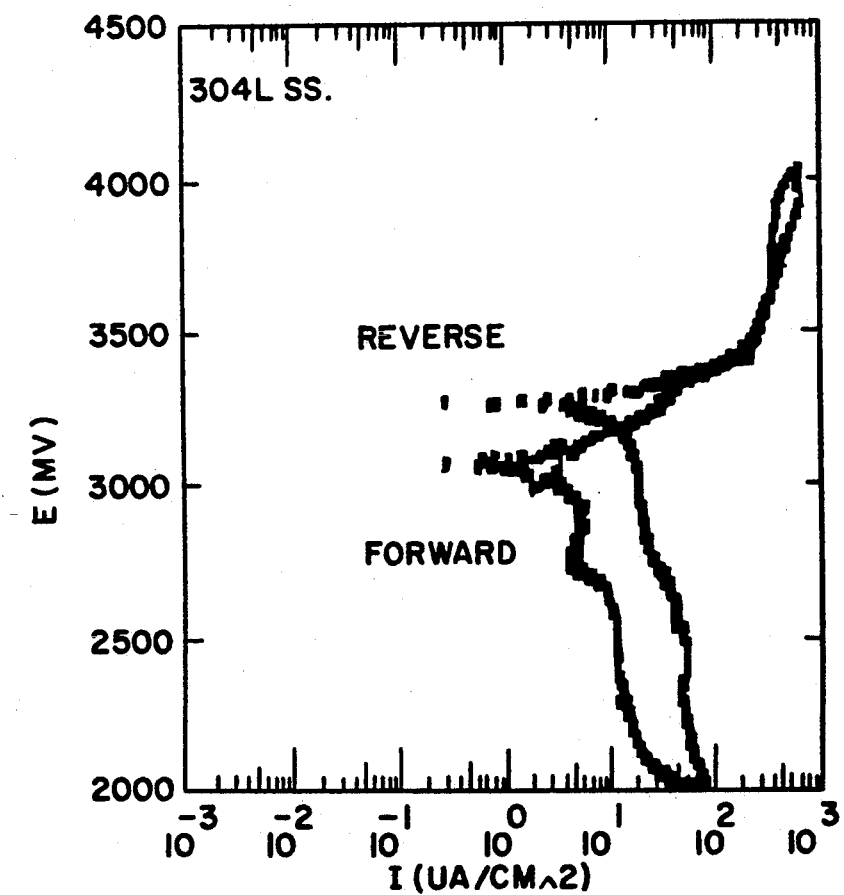
FIG. 7 is a cyclic polarization plot for 304L SS in 1M $LiAsF_6$/PC/DME 1:1.
Figure 8:
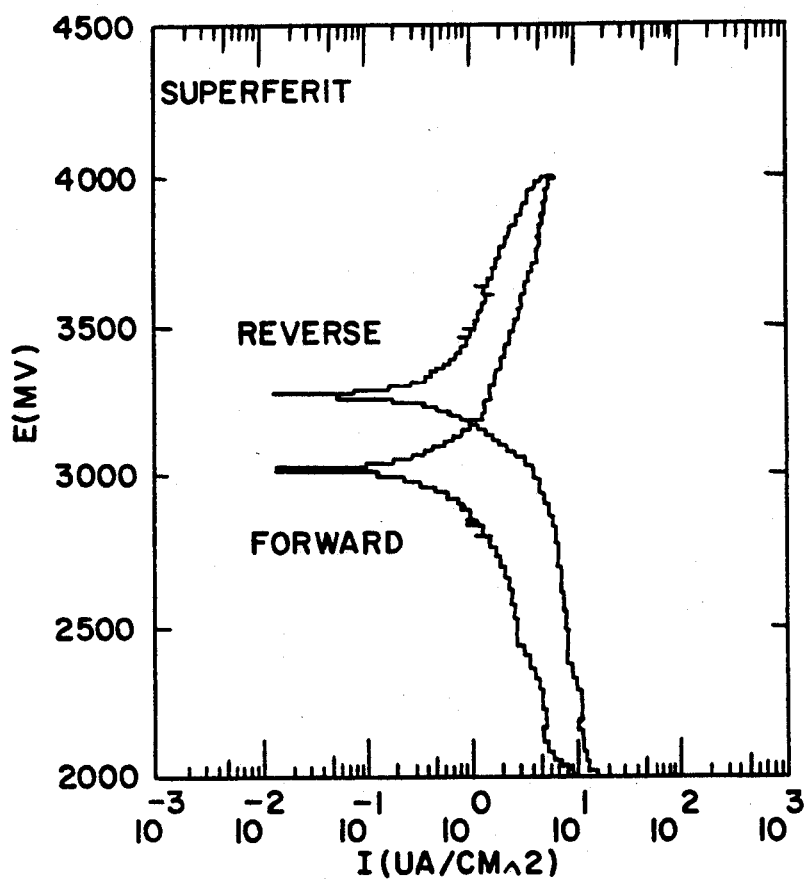
FIG. 8 is a cyclic polarization plot for SUPERFERRIT in 1M $LiAsF_6$/PC/DME 1:1.
Figure 9:
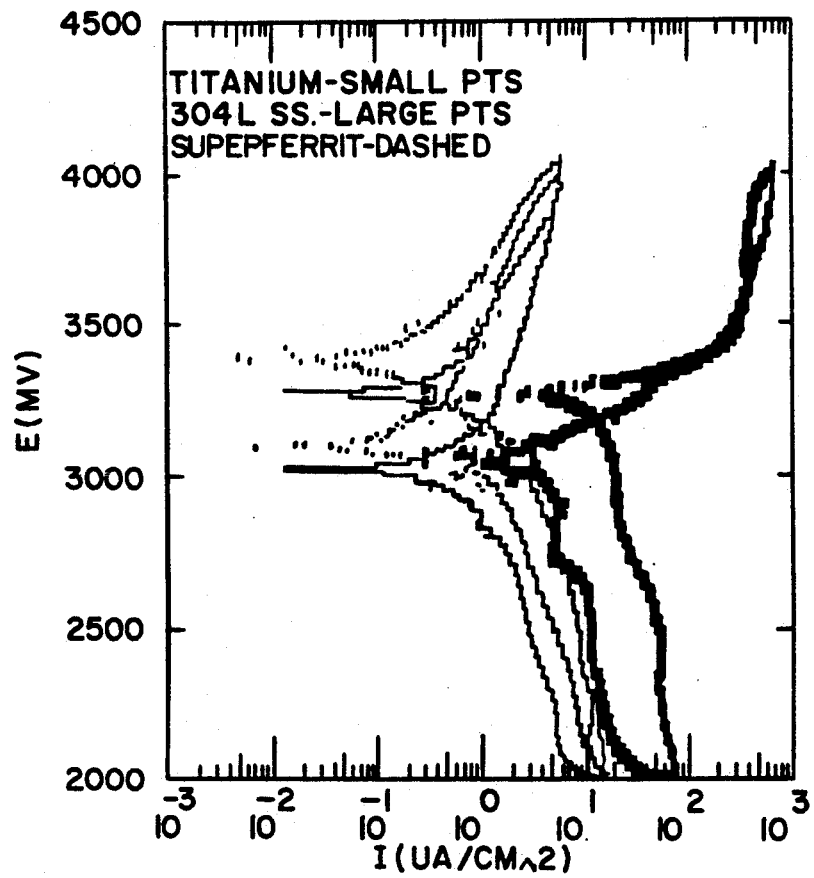
FIG. 9 is a superimposition of cyclic polarization plots for 304L SS/SUPERFERRIT/Titanium in 1M $LiAsF_6$/PC/DME 1:1.

Cyclic polarization test was used as a qualitative measure for detecting material tendencies toward pitting corrosion in the electrolyte. The cyclic polarization technique used was in accordance with ASTM G61-78 entitled "Standard Practice". A forward scan from 2 V to 4 V with a reverse scan from 4 V to 2 V at 1 mV/s was performed. The current response for the applied potential relative to lithium was recorded. The semi-log plots for titanium, 304L SS and SUPERFERRIT are shown in FIGS. 6, 7 and 8 respectively. The three metals are compared and shown in the superimposition of FIG. 9. It was observed that current densities for 304L SS are greater than for titanium and SUPERFERRIT.

EXAMPLE V

Figure 12:
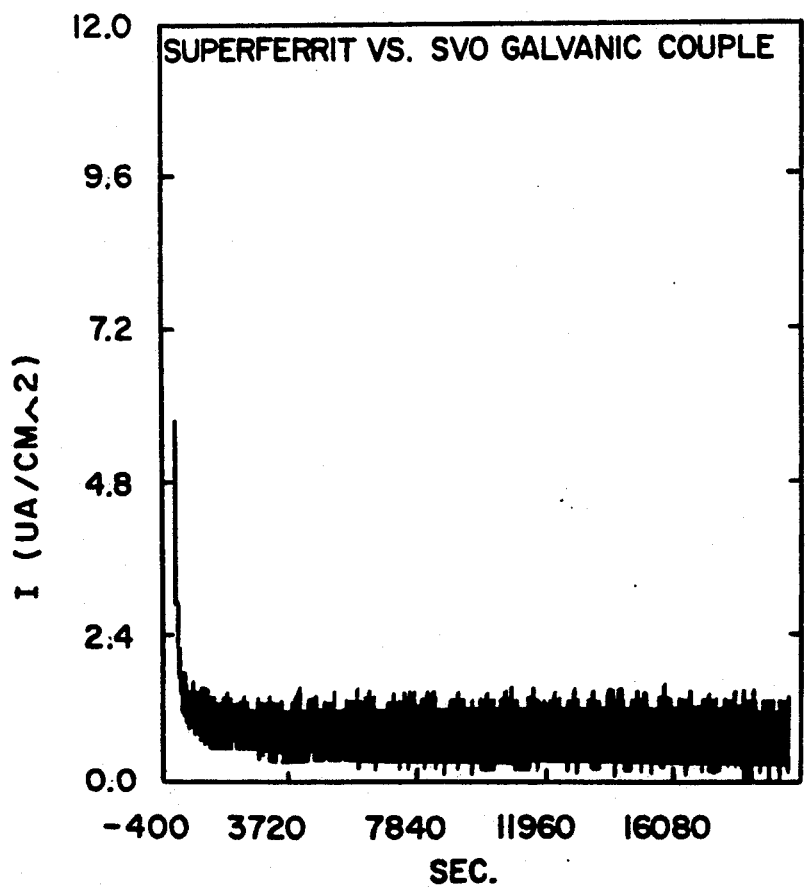
FIG. 12 is a galvanic plot for SUPERFERRIT vs. SVO in 1M LiAsF$_6$/PC/DME 1:1.
Figure 10:
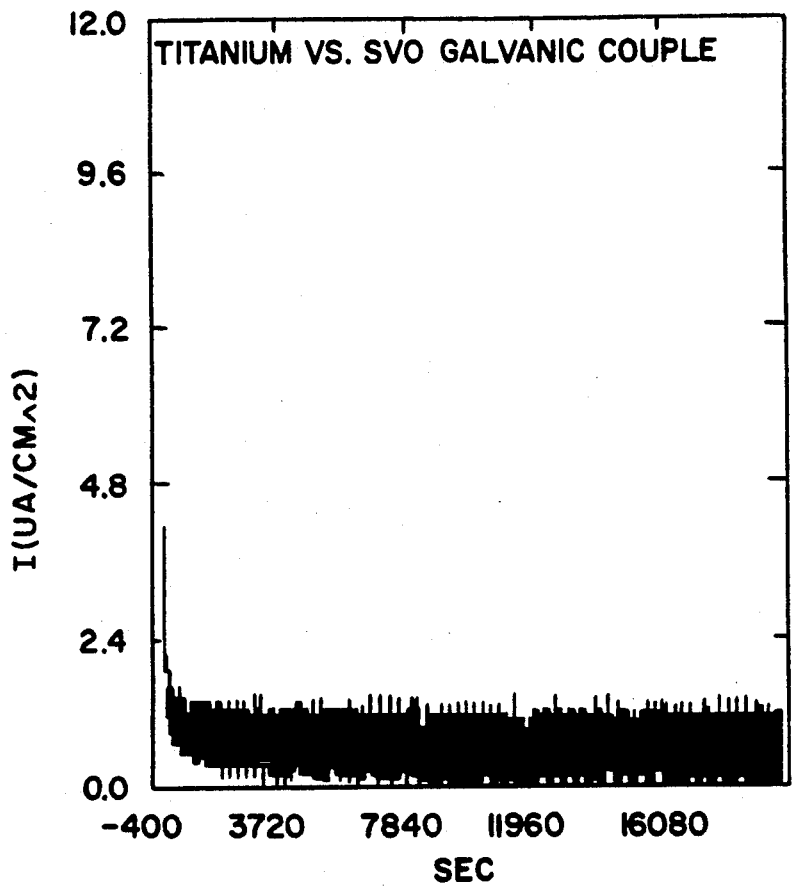
FIG. 10 is a galvanic plot for titanium vs. SVO in 1M $LiAsF_6$/PC/DME 1:1.
Figure 11:
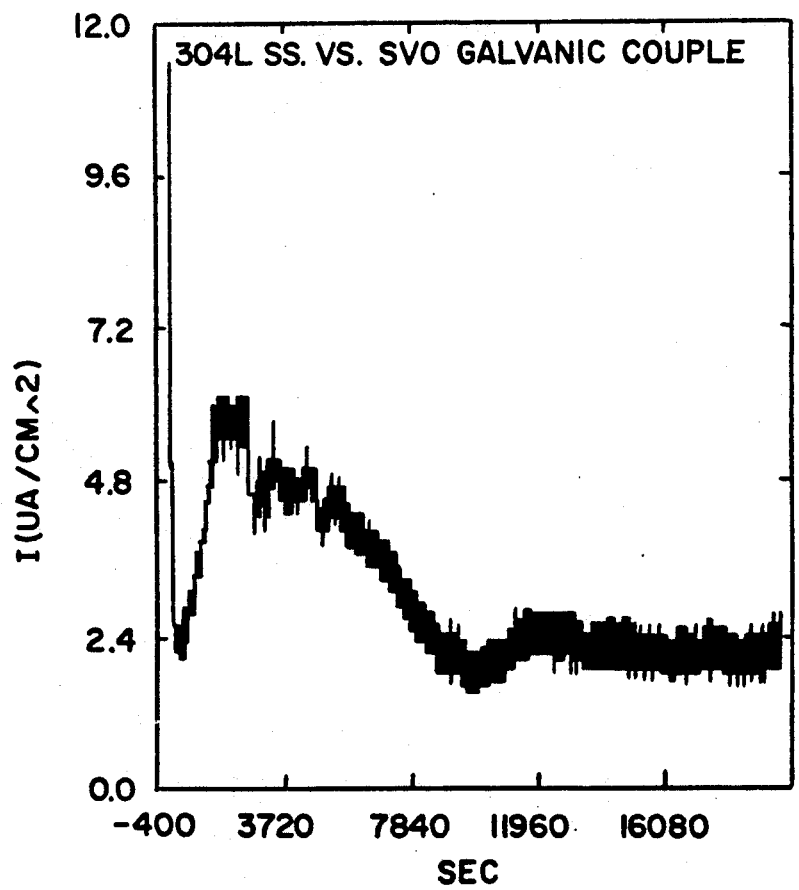
FIG. 11 is a galvanic plot for 304L SS vs. SVO in 1M LiAsF$_6$/PC/DME 1:1.

Galvanic corrosion studies were conducted to observe the mutual effects on materials relative to each other in the same environment. The current in the system was monitored over a 5.5 hour period. Initial and final potentials between the materials was recorded. Galvanic corrosion experiments were completed for the test samples versus a silver vanadium oxide (SVO) pellet and versus a molybdenum disk. In addition to the standard test sample, each test disk also had a small molybdenum tab spotwelded to the surface, simulating cathode screen to molybdenum pin attachment, and tested versus a SVO pellet. FIGS. 10, 11 and 12 show the overall test data of the metal/SVO galvanic couple. Note the higher current densities for 304L SS versus SVO and the similarity in performance of titanium and SUPERFERRIT versus SVO. The initial and final potentials between the metal and SVO were also elevated for 304L SS when compared to the other two test metals.

Figure 13:
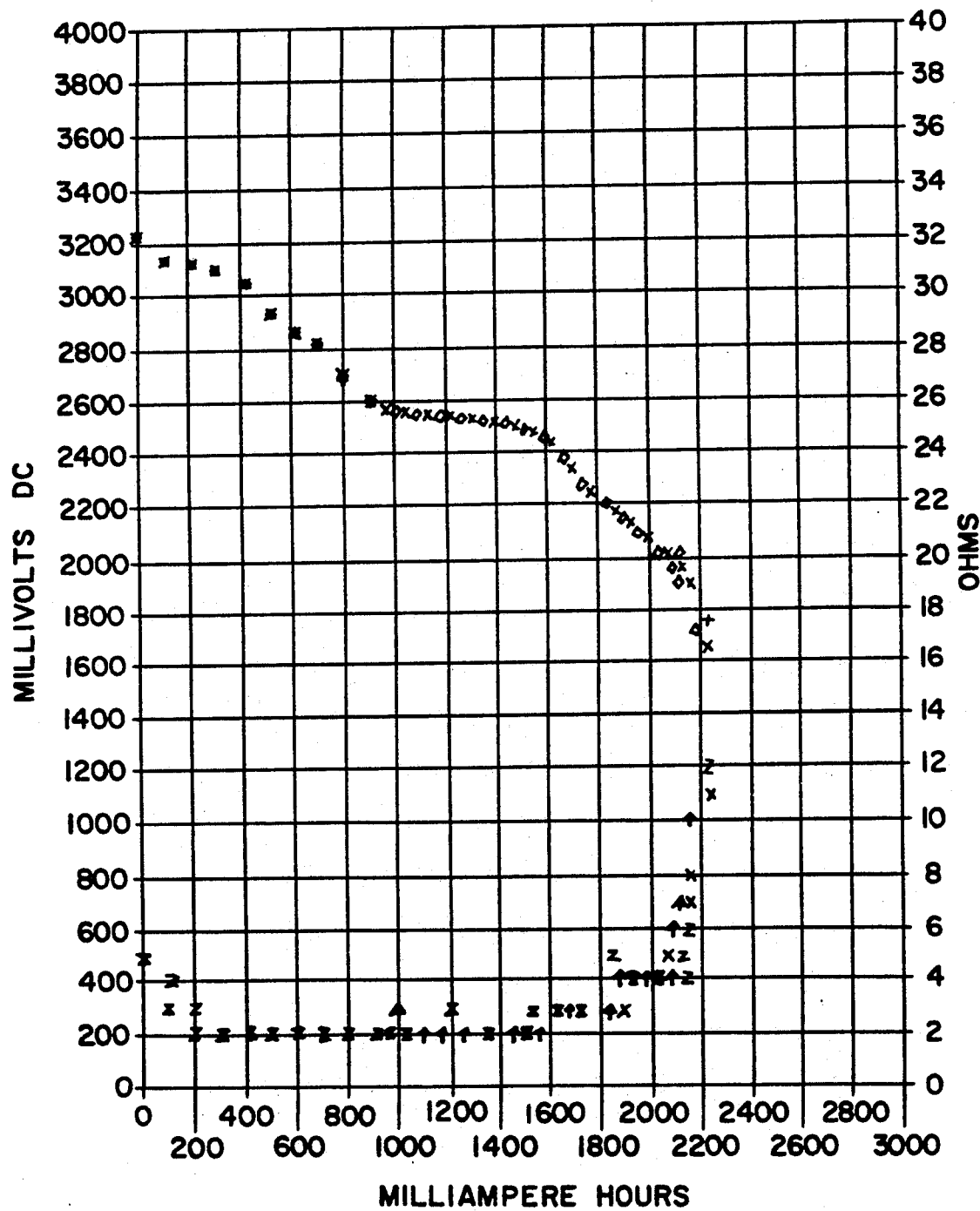
FIG. 13 is a graph showing discharge at 37° C. of the 7 mm cell prepared in Example I having SUPERFERRIT as the cathode current collector material.
Figure 14:
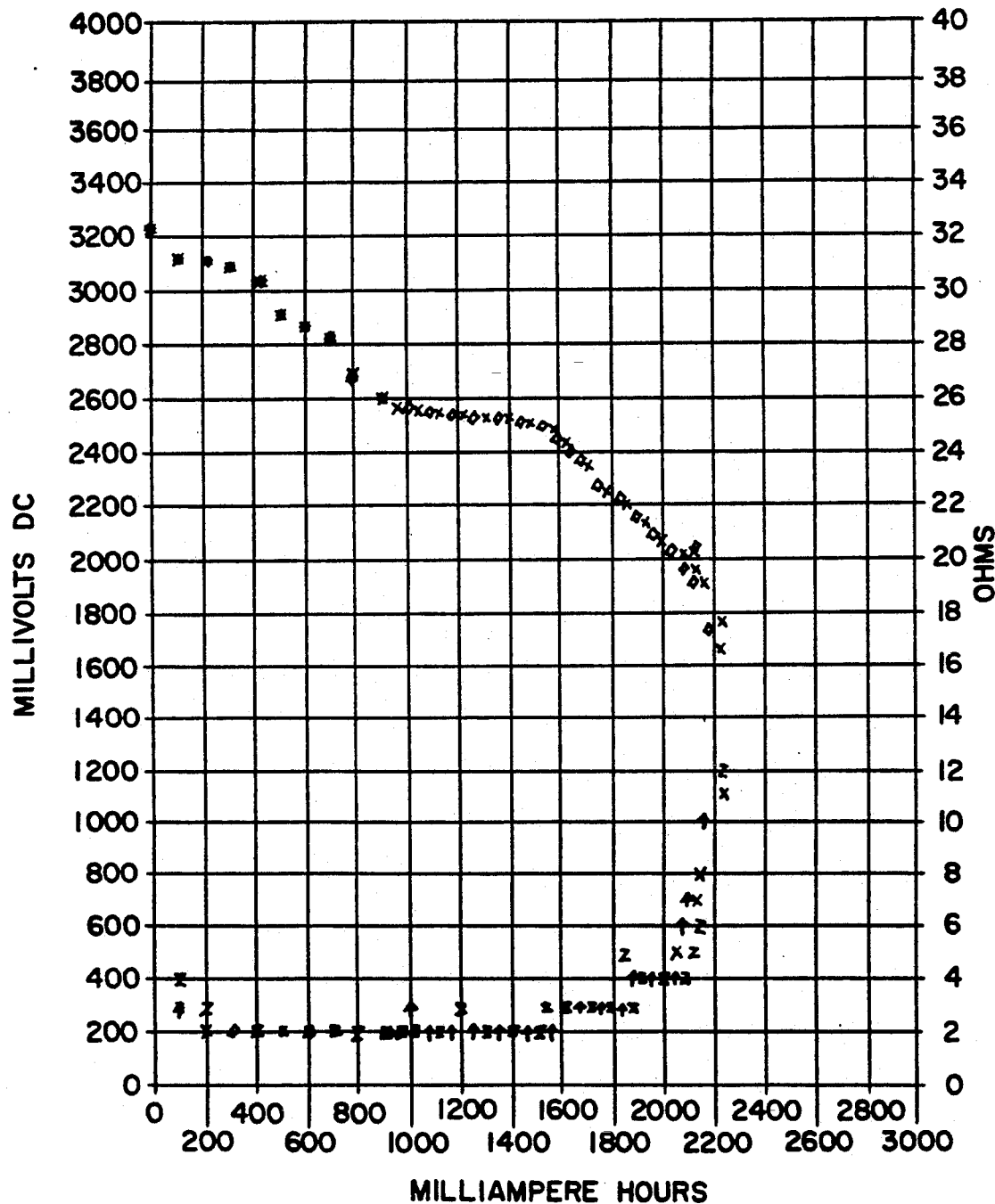
FIG. 14 is a graph showing discharge at 37° C. of the 7 mm cell prepared in Example I having titanium as the cathode current collector material.

EXAMPLE VI 7 mm thick lithium silver vanadium oxide cells built according to Example I having SUPERFERRIT and titanium as cathode current collector material were discharged at 37° C. at 5K to end of life. The discharge curves for the SUPERFERRIT containing cell is shown in FIG. 13. The discharge curves for the titanium containing cell is shown in FIG. 14. It is observed that cells having SUPERFERRIT and titanium as cathode current collector materials exhibited similar performance characteristics. This suggests that the nickel element of the SUPERFERRIT material does not adversely affect cell performance.

EXAMPLE VII

Figure 15:
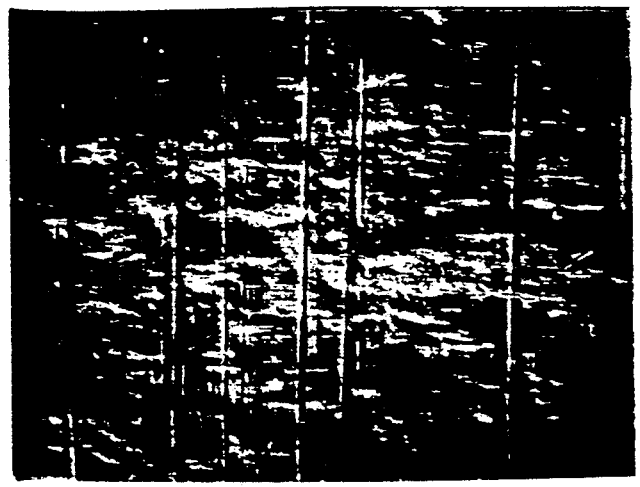
FIG. 15 is a micrograph of titanium as cathode current collector material before exposure.
Figure 16:
FIG. 16 is a micrograph of SUPERFERRIT as cathode current collector material before exposure.
Figure 17:
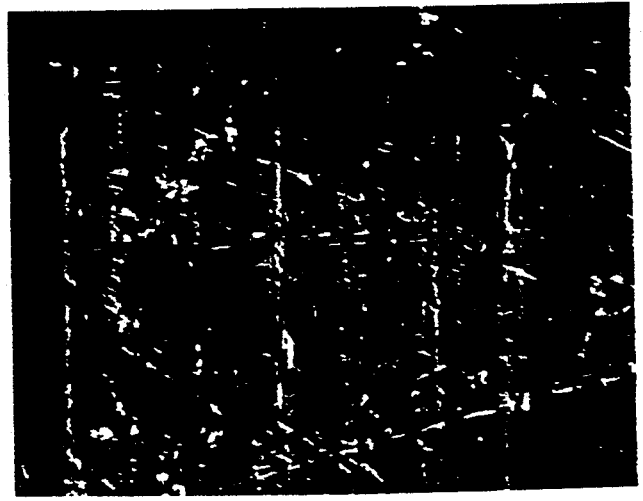
FIG. 17 is a micrograph of 304L SS as cathode current collector material before exposure.
Figure 18:
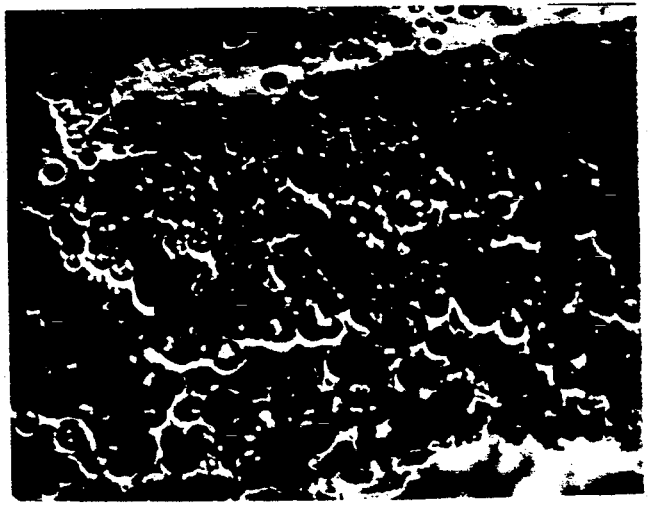
FIG. 18 is a micrograph of titanium as cathode current collector material after exposure at 72° C.
Figure 19:
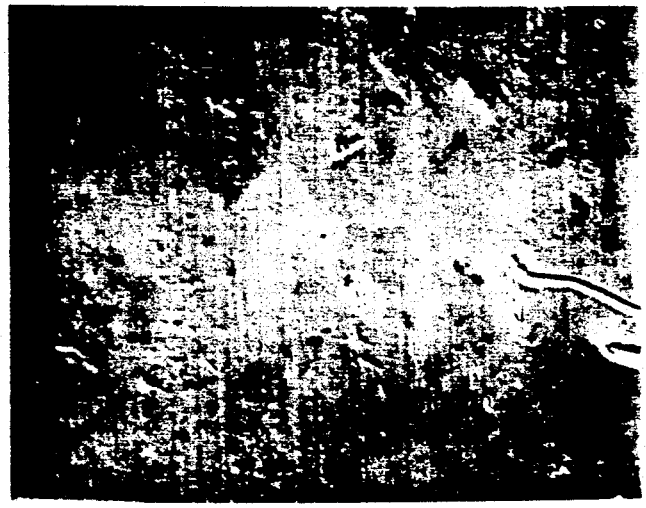
FIG. 19 is a micrograph of SUPERFERRIT as cathode current collector material after exposure at 72° C.
Figure 20:
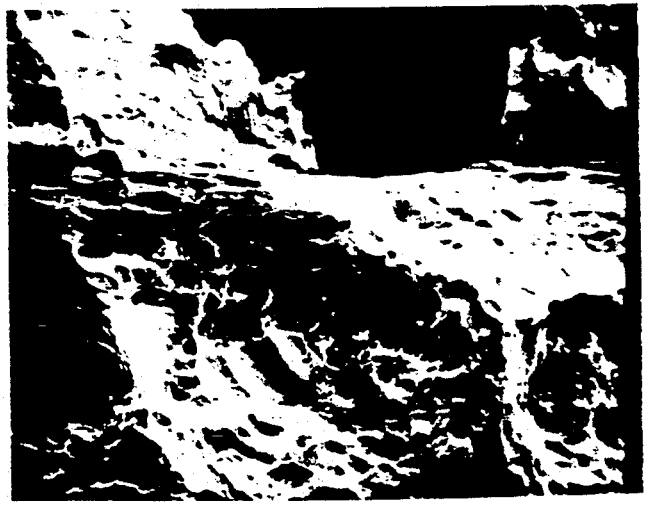
FIG. 20 is a micrograph of 304L SS as cathode current collector material after exposure at 72° C.

Micrographs at 600× magnification for cathode current collector materials titanium, SUPERFERRIT and 304L SS before exposure are shown in FIGS. 15, 16 and 17, respectively. Micrographs at 600× magnification for cathode current collector materials titanium, SUPERFERRIT and 304L SS after a three month exposure at 72° C. are shown in FIGS. 18, 19, and 20 respectively. The results indicate that 304L SS exhibited massive corrosion, the titanium exhibited pitting and the SUPERFERRIT exhibited no change. This indicates that SUPERFERRIT exhibits superior corrosion resistance compared to the other cathode current collector materials. Furthermore, it has been discovered that the nickel element in the formulation does not serve as a detriment with respect to corrosion as suggested in Japanese patent publication Nos. 186467 and 15067.

We claim:

1. In an electrochemical cell comprising a lithium anode, a solid cathode material used in conjunction with a metal cathode current collector, and an ionically conductive electrolyte solution operatively associated with said anode and cathode, wherein the improvement comprises a cathode current collector of a highly alloyed nickel-containing ferritic stainless steel material, said material providing high corrosion resistance particularly where elevated temperature storage and performance is required thereby increasing cell longevity, said material comprising, by weight:

from about 27.0 percent to about 29.0 percent chromium;

from about 2.0 percent to about 3.0 percent molybdenum;

from about 3.0 percent to about 4.5 percent nickel;

the sum of carbon plus nitrogen in an amount less than or equal to 0.045 percent;

the sum of niobium plus zirconium in an amount of at least ten times the percent of carbon plus nitrogen; and the remainder being iron.

2. The cell of claim 1, wherein said highly alloyed nickel-containing ferritic stainless steel material further comprises, by weight, small amounts of trace elements.

3. The cell of claim 2, wherein said trace elements are selected from the group consisting of copper, magnesium, phosphorous, sulfur and silicon.

4. In an electrochemical cell comprising a lithium anode, a solid cathode material used in conjunction with a metal cathode current collector, and an ionically conductive electrolyte solution operatively associated with said anode and cathode, wherein the improvement comprises a cathode current collector of a highly alloyed nickel-containing ferritic stainless steel material, said material providing high corrosion resistance particularly where elevated temperature storage and performance is required thereby increasing cell longevity, said material comprising, by weight:

from about 28.0 percent to about 30.0 percent chromium;

from about 3.5 percent to about 4.2 percent molybdenum;

from about 2.0 percent to about 2.5 percent nickel;

the sum of carbon plus nitrogen in an amount less than or equal to 0.025 percent; and the remainder being iron.

5. The cell of claim 4, wherein said highly alloyed nickel-containing ferritic stainless steel material further comprises, by weight, small amounts of trace elements.

6. The cell of claim 5, wherein said trace elements are selected from the group consisting of copper, magnesium, phosphorous, sulfur and silicon.

7. The cell of claim 1, wherein said solid cathode material is selected from the group consisting of metal oxide bronze, fluorinated carbon and metal oxide.

8. The cell of claim 7, wherein said metal oxide bronze is silver vanadium oxide.

9. The cell of claim 7, wherein said fluorinated carbon is polycarbon monofluoride ($CF_x$) wherein x ranges from about 0.5 to about 1.2.

10. The cell of claim 1, wherein said cathode current collector material is in the form of a sheet.

11. The cell of claim 1, wherein said cathode current collector material is in the form of a screen.

* * * * *